(12) United States Patent
Sabramanian et al.

(10) Patent No.: US 7,062,646 B2
(45) Date of Patent: Jun. 13, 2006

(54) GENERIC INTERFACE AND FRAMEWORK TO PUBLISH AND MONITOR PLATFORM CONFIGURATION

(75) Inventors: Srinivasan Sabramanian, Palo Alto, CA (US); John G Johnson, San Jose, CA (US); Gregory C Onufer, Palo Alto, CA (US); Richard A Zatorski, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 599 days.

(21) Appl. No.: 10/254,952

(22) Filed: Sep. 25, 2002

(65) Prior Publication Data
US 2004/0030879 A1    Feb. 12, 2004

Related U.S. Application Data

(60) Provisional application No. 60/413,016, filed on Aug. 9, 2002.

(51) Int. Cl.
*G06F 15/177*    (2006.01)

(52) U.S. Cl. .............................. 713/1; 719/315; 710/8

(58) Field of Classification Search ..................... None
See application file for complete search history.

(56) References Cited

U.S. PATENT DOCUMENTS 5,809,329 A * 9/1998 Lichtman et al. ............... 710/8

OTHER PUBLICATIONS

"Portable Instrumented Communication Library (PICL)," Patrick H. Worley, pp. 2, Sep. 12, 2000.
"A Simple Network Management Protocol (SNMP)," Case et al., MIT Laboratory for Computer Science, pp. 1-31, May 1990.

* cited by examiner

*Primary Examiner*—Lynne H. Browne
*Assistant Examiner*—Anand B. Patel
(74) *Attorney, Agent, or Firm*—Meyertons Hood Kivlin Kowert & Goetzel, P.C.; B. Noël Kivlin

(57) ABSTRACT

A method and system to allow user applications can access hardware platform-specific configuration information in a generic way. A platform independent framework lies on a layer that interfaces with the operating system layer. Accordingly, when a platform is changed, the operating system layer is notified of the change to facilitate informing the user of the change. This framework also has a plug-in publishing interface that is used to develop platform-specific modules to publish or export hardware configurations to other users. In another embodiment, this framework has a user interface that allows the user to make the necessary changes to the system management and hardware diagnostic tools whenever the platform is changed to ensure that the tools function correctly.

23 Claims, 6 Drawing Sheets

GENERIC INTERFACE AND FRAMEWORK TO PUBLISH AND MONITOR PLATFORM CONFIGURATION

CROSS-REFERENCE TO RELATED APPLICATION

This application claims priority pursuant to 35 U.S.C §119(e) to U.S. Provisional Application Ser. No. 60/413,016, filed Aug. 9, 2002.

BACKGROUND OF THE INVENTION

1. Field of the Invention

The present invention relates primarily to the field of computer systems, and in particular to publishing and accessing platform configuration information.

2. Background Art

Network management implicates several concerns, including security (e.g., ensuring that the network is protected from unauthorized users), performance (e.g., eliminating bottlenecks in the network) and reliability (e.g., making sure the network is available to users and responding to hardware and software malfunctions). A system administrator may use a wide variety of software and hardware products to help manage a network. For example, conventional computer networks utilize system management and hardware diagnostic tools to manage the network or devices.

One example of a protocol for system management and hardware diagnostic tools is Simple Network Management Protocol (SNMP). Generally, SNMP operates by sending messages, called protocol data units (PDUs), to different parts of the computer network. SNMP-compliant devices, called agents, store data about themselves in Management Information Bases (MIBs) and return this data to the SNMP requesters. Each MIB is a database of objects that can be monitored by a network management system. Network management protocols, such as SNMP, use standardized MIB formats that allow any set of network management tools, e.g., SNMP tools, to monitor any device defined by a MIB. Accordingly, the characteristics or variables of an agent's MIB may be inspected or modified by a remote user.

Typically, conventional system management and hardware diagnostic tools may read the underlying platform configurations for reporting and monitoring purposes. For example, by employing an agent process on each of the managed hosts in a network, SNMP may collect and report the hardware platform configuration information to a central station. But one serious disadvantage is that the management and hardware diagnostic tools that monitor hardware platform configuration for purposes of reporting and monitoring do not function correctly if they are not informed about a change in hardware platform. As a result, the system administrator and user applications must update the tools by manually making several changes in various agent portions of the tools with every change in the hardware platform. The update process therefore requires a significant expenditure of time and other resources. Hardware platform changes occur frequently—existing hardware platforms are often upgraded with every new release of the platform or are replaced by new and different platforms. Thus, these tools have to be constantly updated. Accordingly, there is a need for a technique to handle upgrades or changes to platforms in a manner that saves time and other resources.

SUMMARY OF THE INVENTION

The present invention is a system and method to allow user applications to access hardware platform specific configuration information in a generic manner. According to one exemplary embodiment of the present invention, a framework that is hardware platform independent allows user applications to access hardware platform specific configuration information. In another exemplary embodiment of the present invention, this hardware platform independent framework has access to platform configuration information and lies on a layer that interfaces with the operating system layer. In another exemplary embodiment, the hardware platform independent framework is not an integral part of the operating system layer but instead resides in a layer created above the operating system. As a result, whenever a hardware platform is changed, the operating system layer can inform higher level software, such as system management and hardware diagnostic tools. Therefore, this configuration saves time during the debugging of this higher level software in the event that this higher level software does not function properly.

According to another embodiment of the present invention, this framework has a user interface to allow a user to make changes to all the agents, such as management and diagnostic tools deployed on the network elements, for example, whenever a platform is changed in the event that minimal changes are necessary to ensure that the agents function correctly. As a result, the user saves a considerable amount of time and other resources. According to yet another embodiment of the present invention, this generic framework also includes a plug-in publishing interface that is used to develop platform-specific modules to publish or export hardware configurations to other users. This published information is preferably classified into well-known classes and well-defined properties that have the same semantics across all platforms.

A more complete understanding of the generic interface and framework will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE INVENTION

The present invention provides a system and method whereby user applications can access hardware platform specific configuration information in a generic manner. In the detailed description that follows, like element numerals are used to describe like elements illustrated in one or more drawings.

Figure 1:
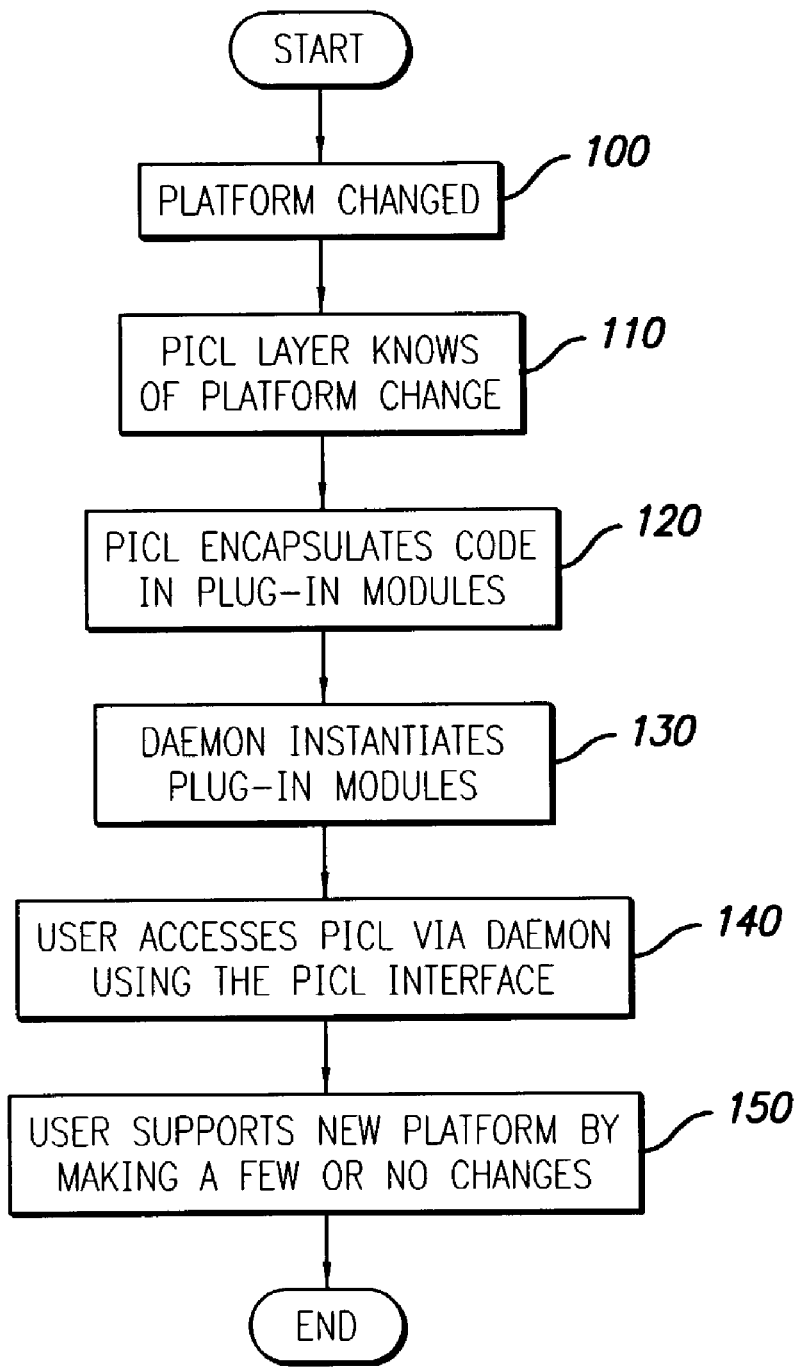
FIG. 1 is an exemplary embodiment of the method for handling a hardware platform change.

FIG. 1 illustrates an exemplary embodiment of the method for handling a hardware platform change. Initially, at step 100, the existing hardware platform is changed to a new platform. The platform is the underlying system hardware and may include the devices attached to the system. As discussed above, the user may change the hardware platform to implement an upgrade or switch to a new version. Alternatively, the user may change the hardware platform to an entirely different type of platform. At step 110, a platform independent configuration layer (PICL) is notified of the platform change. The PICL has access to platform configuration information and lies on a layer that interfaces with the operating system layer. Preferably, the PICL is not an integral part of the operating system layer but instead resides in a layer created above the operating system. As a result, whenever a hardware platform is changed, the operating system layer can inform higher level software, such as system management and hardware diagnostic tools. Therefore, this configuration saves time during the debugging of this higher level software in the event that this higher level software does not function properly. Generally, the PICL class is a defined set of properties, wherein a property is an attribute with a name and value pair. A node is one instantiation of the PICL class. The PICL interfaces is preferably the first system or network component to be notified of the platform change.

At step 120, the PICL encapsulates any platform-specific code into one or more plug-in modules. The PICL allows any platform-specific code to be encapsulated into one or more publish and monitor modules or plug-in modules. A plug-in module may be a co-operative module that is instantiated by a PICL daemon to collect platform data. At step 130, the PICL daemon instantiates those plug-ins that are specific to the new platform. Accordingly, the PICL daemon produces a more defined version of the plug-in modules by replacing the plug-in module variables with values or other variables associated with the platform data. The plug-in module creates nodes and properties in the PICL tree to represent the platform data. The PICL daemon preferably instantiates only those plug-ins that are applicable to the specific platform.

At step 140, a user accesses the PICL via the daemon using a PICL interface. The user has access to the platform configuration information via the PICL daemon using a PICL interface. The PICL interface is a platform independent interface. In the event that changes are necessary, the PICL interface allows the user to make changes to the system management and hardware diagnostic tools. Accordingly, at step 150, the user supports the new platform by making any necessary changes to the system management and hardware diagnostic tools. Typically, if any changes are required, the modifications will be minimal.

The PICL Framework

As discussed above, the PICL is used to publish platform information such that the information can be accessed by a user in a platform independent manner. The platform information includes, for example, the device tree and the association between the devices. This publication is accomplished by employing a set of plug-in modules that collect the platform configuration and creates the PICL tree.

Figure 2:
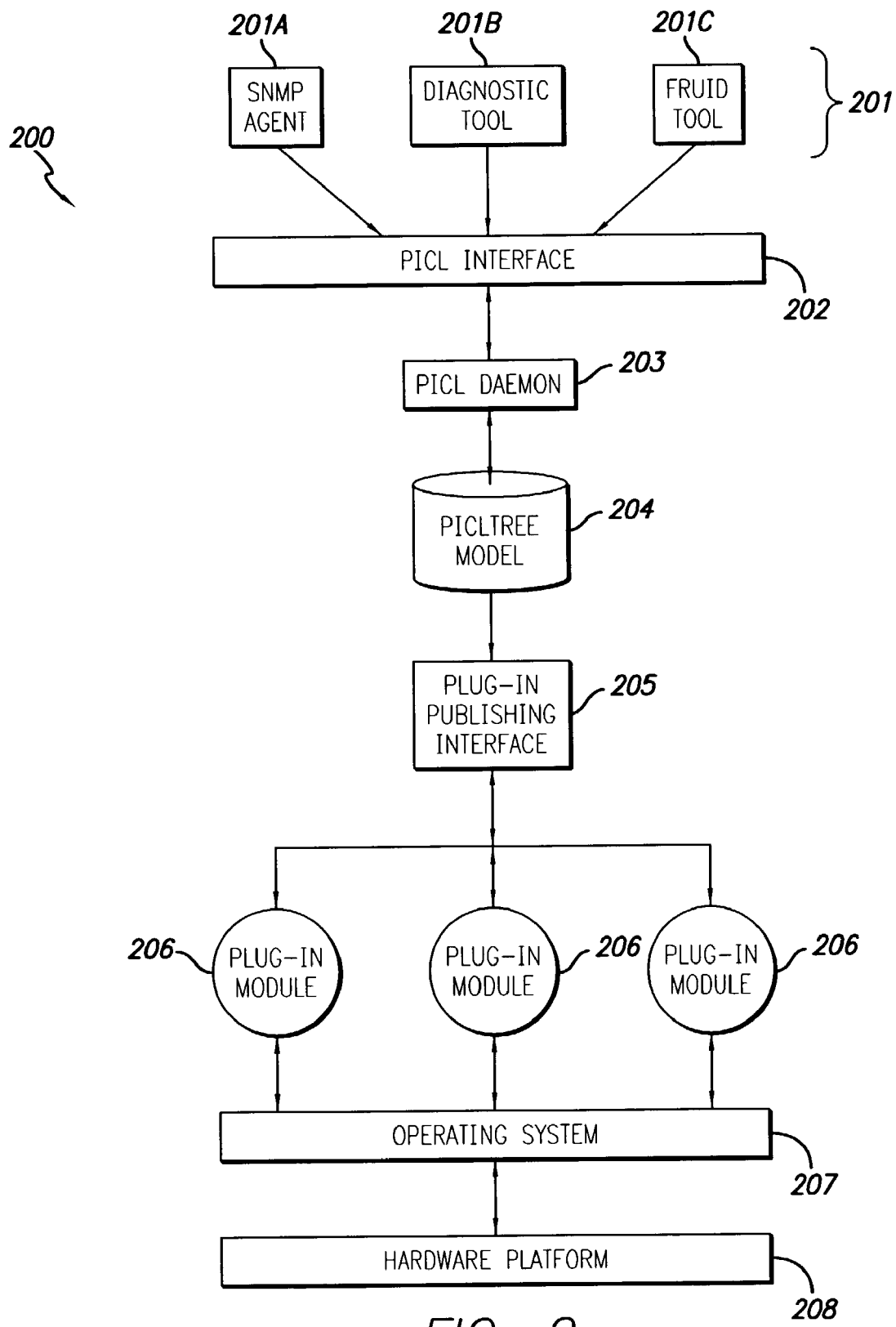
FIG. 2 is an exemplary embodiment of the PICL framework.

FIG. 2 shows an exemplary embodiment of a PICL framework 200. PICL framework 200 is composed of clients 201. Clients 201 may include system management and hardware diagnostic tools. For example, as shown in FIG. 2, clients 201 may include SNMP agent 201A, diagnostic tool 201B and FRUID tool 201C. Clients 201 have access to PICL interface 202 which allows clients 201 to interface with the PICL framework 200. In turn, PICL interface 202 is connected to PICL daemon 203.

PICL daemon 203 is connected to PICL tree or PICL tree model 204. PICL tree model 204 uses plug-in publishing interface 205 to communicate with the plug-in modules 206. PICL framework 200 may include one or more plug-in modules, and typically includes several modules. Plug-in modules 206 interface with operating system 207. Operating system 207 in turn interfaces with hardware platform 208.

The PICL Interfaces

As discussed above, PICL interface 202 is a layer between the user 201 and the daemon 203. PICL interface 202 consists of a set of functions and data structures that provide a platform independent interface for a user 201 to query the platform information that is maintained by the daemon 203. The information published via the PICL framework 200 is organized into a tree, where each node is an instance of a well-defined PICL class. The base class of the PICL may be designated as the "picl" class. This base class defines a basic set of properties that all the nodes in the tree must possess.

Table 1 below shows an exemplary embodiment of the property set of a picl class node. All property names in Table I with a leading underscore ('_') are reserved for use by the PICL framework 200. These reserved property names are used to refer to a node's parent, child or peer nodes. A user 201 can access a reserved property, but only by its name because these properties do not have a handle associated to them and the property "name" is not a reserved property, but a mandatory property of all nodes.

TABLE 1

| Property Name | Property Value |
| --- | --- |
| name | The name of a node |
| _parent | The node handle of the parent node |
| _child | The node handle of the first child node |
| _peer | The node handle of the next peer node |

Properties may be classified into various types, including those that have integer values, unsigned-integer values, and floating point values, for example. The size of a property generally specifies the size of its value in bytes. For example, a table property type has a handle to a table as its value. As another example, a reference property type has a handle to a node in the tree as its value and can be used to establish an association between any two nodes in the tree.

The reference property type may also be used by plug-in modules to publish properties in nodes of different classes. In order to ensure that these property names are unique, the property names may be prefixed by _<picl_class_name>_, where <picl_class_name> is the class name of the node referenced by the property. A valid PICL class name may be any combination of uppercase and lowercase letters 'a' through 'z', digits '0' through '9', and the minus ('−') character. Furthermore, the string that follows the _<picl_class_name>_ portion of a reference property name may be used to indicate a specific property in the referenced class, if applicable. Table 2 below shows an exemplary list of different PICL property types. These property types may be enumerated in picl_prop_type_t, for example.

TABLE 2

| Property Type | Property Value |
| --- | --- |
| PICL_PTYPE_VOID | None (Property exists, but has no value) |
| PICL_PTYPE_INT | Integer value |
| PICL_PTYPE_UNSIGNED INT | Unsigned integer value |
| PICL_PTYPE_FLOAT | Floating-point value |
| PICL_PTYPE_REFERENCE | PICL node handle |
| PICL_PTYPE_TABLE | Handle to a table |
| PICL_PTYPE_TIMESTAMP | Time in seconds since epoch |
| PICL_PTYPE_BYTEARRAY | An array of bytes |
| PICL_PTYPE_CHARSTRING | A null terminated string |

Figure 3:
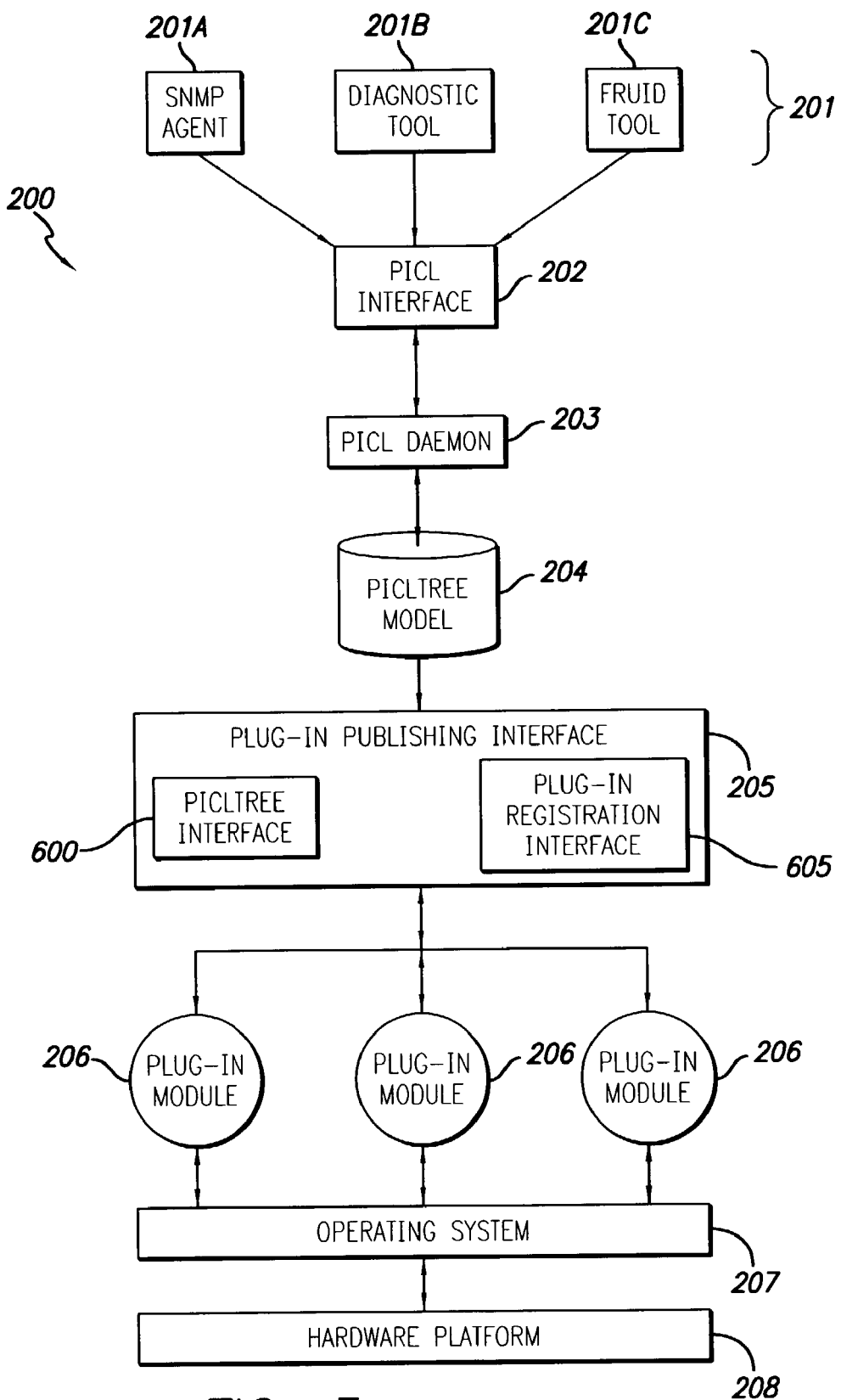
FIG. 3 is another exemplary embodiment of the PICL framework.

In another exemplary embodiment of PICL framework 200, shown in FIG. 3, the plug-in publishing interface 205 may consist of two main interfaces, the PICL tree interface 600 and the plug-in registration interface 605. Access to the PICL tree interface 600 and plug-in registration interface 605 is preferably kept transparent to the user. The PICL tree interface 600 consists of a set of functions and data structures that may be used by PICL daemon 203 and plug-in modules 206 to access and manipulate the PICL tree. For example, plug-in modules 206 use the PICL tree interface 600 to create nodes that contain the platform information. Similarly, the PICL daemon 203 uses the PICL tree interface 600 to access the information requested by a user 201. The plug-in registration interface 605 specifies how a plug-in module 206 registers itself with the PICL daemon 203.

Figure 4:
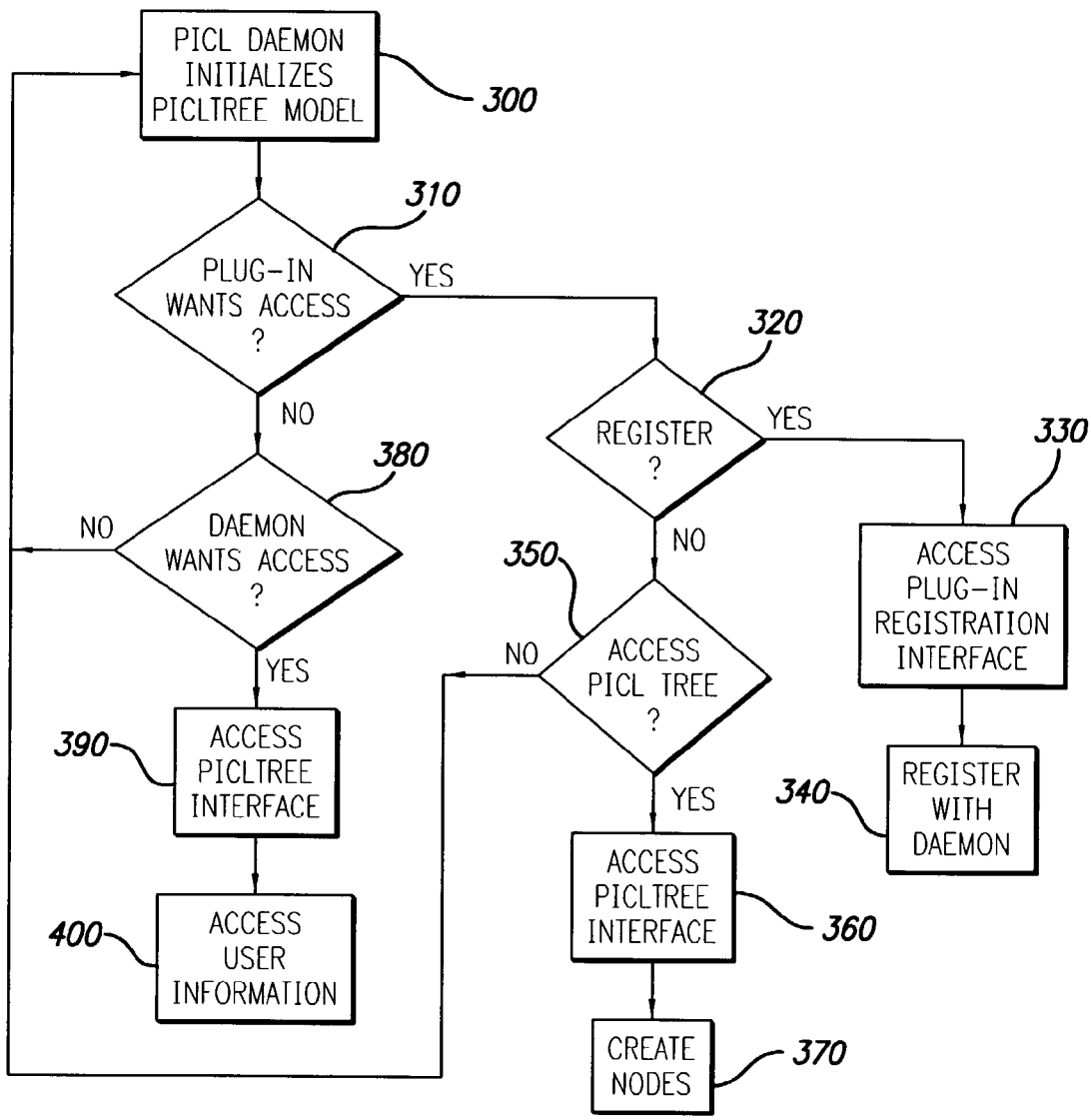
FIG. 4 is a flowchart illustrating the interaction between an exemplary embodiment of the PICL interface with the plug-in modules and the PICL daemon.

FIG. 4 is a flowchart showing an exemplary embodiment of the interaction between plug-in publishing interface 205 and PICL daemon 203 and plug-in modules 206 via PICL tree interface 600 and plug-in registration interface 605. At step 300, PICL daemon 203 initializes the PICL tree model 204. At step 310, it is determined whether a plug-in module requires access to plug-in publishing interface 205 to accomplish a particular task. If so, then at step 320, it is determined whether the plug-in module is attempting to register itself with PICL daemon 203. If the plug-in module needs to register itself, the module accesses plug-in registration interface 605 at step 330 and registers with the PICL daemon at step 340 in accordance with a set of appropriate specifications. However, if at step 350 the plug-in module is attempting to access and manipulate the PICL tree at step 350, then the plug-in module 206 accesses the PICL tree interface 600 at step 360. After the plug-in module 206 has accessed the PICL tree interface 600, the plug-in module 206 may access and manipulate the PICL tree. For example, the plug-in module 206 may create nodes that contain platform information at step 370. On the other hand, if the plug-in modules 206 do not need to use plug-in publishing interface 205, then, at step 380 it is determined whether PICL daemon 203 wants to access and manipulate the PICL tree using plug-in publishing interface 205. If so, then at step 390, the PICL daemon 203 accesses PICL tree interface 600 to access user requested information at step 400.

The PICL Daemon

As discussed above, PICL daemon 203 is a layer between PICL interface 202 and the platform information contained in the PICL tree. PICL daemon 203 maintains and controls access to the PICL tree by initializing the plug-in modules 206 provided for the platform, and awaiting requests from a user 201. When a user request is received, PICL daemon 203 returns the necessary information from the PICL tree back to the user 201. If a user 201 accesses a volatile property, PICL daemon 203 automatically invokes the access method provided by the appropriate plug-in module 206 which publishes the property, and returns its results to the user 201.

Figure 5:
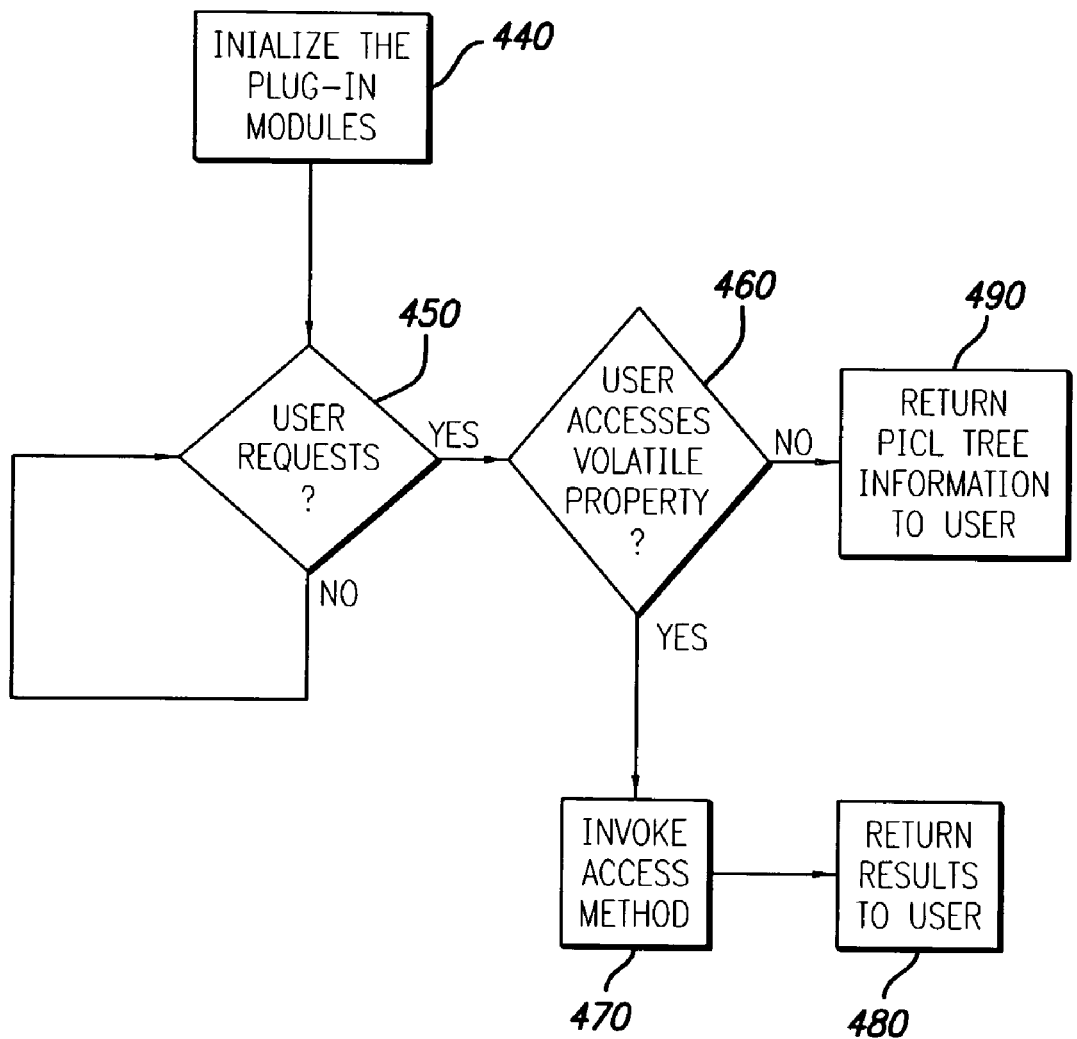
FIG. 5 is a flowchart illustrating the operation an exemplary embodiment of a PICL daemon.

FIG. 5 is a flowchart showing an exemplary embodiment of the functioning of PICL daemon 203. Initially, at step 440, PICL daemon 203 initializes the plug-in modules 206. Next, at step 450, PICL daemon 203 waits for a user request. If PICL daemon 203 receives a user request, then, at step 460, PICL daemon 203 determines if the user 201 has accessed a volatile property area. If it has, then, at step 470, PICL daemon 203 invokes the access method provided by the appropriate plug-in module 206 and, at step 480, PICL daemon 203 returns the results back to the user 201. If, on the other hand, the user 201 does not access a volatile area at step 460, then, at step 490, the necessary information from the PICL tree is returned to the user 201.

The PICL Plug-in Modules

As discussed above, PICL plug-in modules 206 may be shared objects that implement the platform-specific data collection functions. These plug-in modules 206 are preferably stored in well-known directories so that PICL daemon 203 can locate and load the plug-in modules 206 easily. Each plug-in module 206 may define a .init section by registering itself with PICL daemon 203 once its .init section is invoked. For example, as shown in FIG. 4, a plug-in module 206 may register itself with PICL daemon 203 via plug-in registration interface 605. At the time of registration, a plug-in module 206 provides PICL daemon 203 with all the relevant data. For example, a plug-in module 206 may provide PICL daemon 203 with the entry points of the plug-in module's initialization and cleanup routines along with its name in a data structure. During registration, a plug-in module 206 may provide information regarding its relationship with other plug-in modules 206. For example, a plug-in module 206 may specify its dependencies on another plug-in module 206 using the '-1' linker option.

When PICL daemon 203 invokes the initialization routine of the plug-in module 206, the module 206 collects the platform information and creates nodes, properties or both to represent the configuration in the PICL tree. In an exemplary embodiment, a plug-in module 206 may create additional threads to monitor the platform configuration and update the PICL tree with any changes, if necessary. This ability enables a PICL plug-in module 206 to operate as a PICL daemon 203 within the PICL framework 200. Plug-in modules 206 may also be implemented to perform platform-specific functions. For example, plug-in modules 206 may be used to perform environmental monitoring. For instance, a PICL plug-in module 206 that serves as an environmental monitor may use a thread to monitor the temperatures and fan speeds of the platform, and publish this environmental information in the PICL tree for access by users 201.

Figure 6:
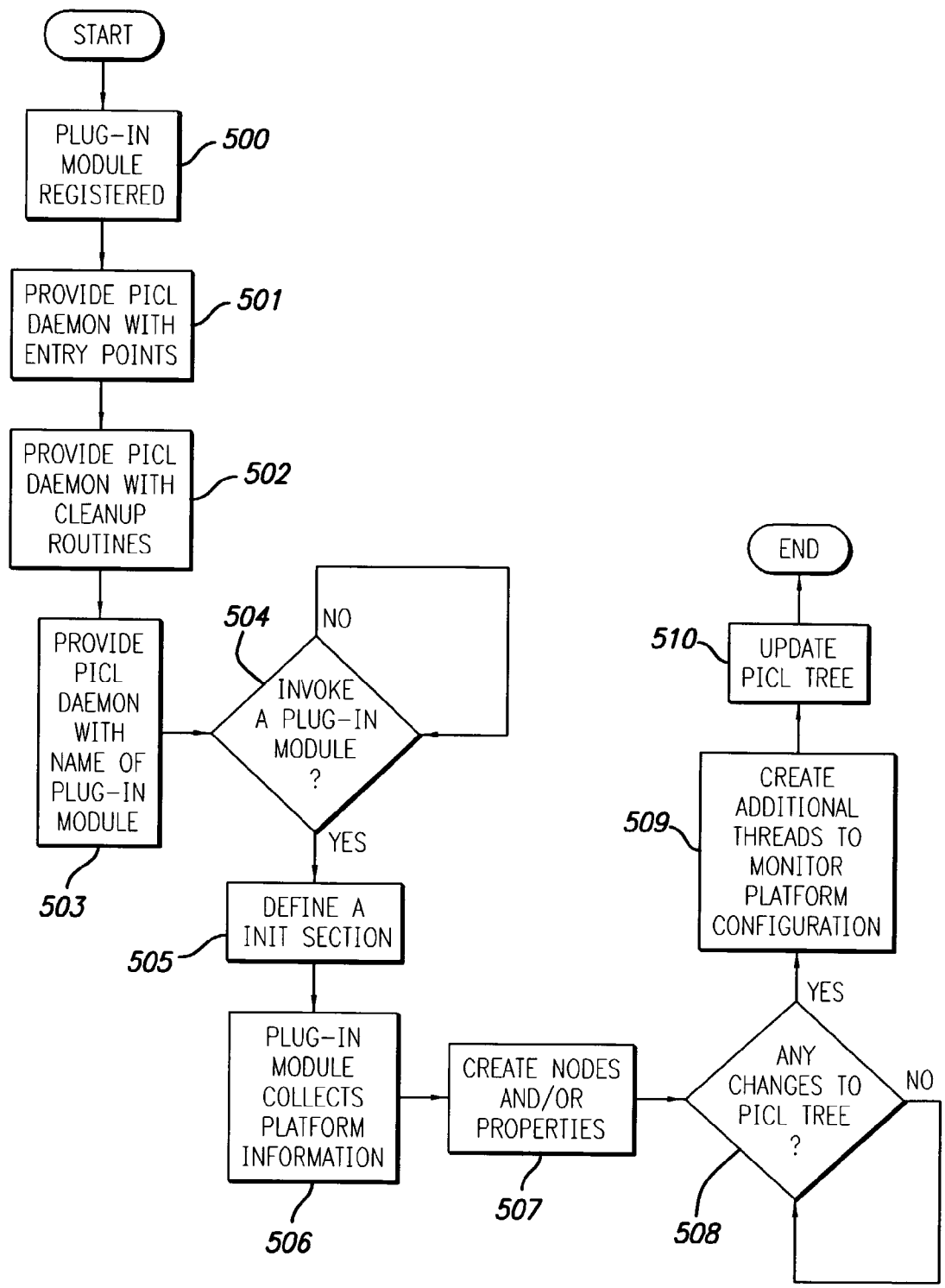
FIG. 6 is a flowchart illustrating the operation of an exemplary embodiment of a PICL plug-in module.

FIG. 6 is a flowchart that illustrates an exemplary embodiment of PICL plug-in module 206 and its functions as described above. Initially, at step 500, a PICL plug-in module 206 is registered. At step 501, the PICL plug-in module 206 provides PICL daemon 203 with its entry points. Next, at step 502, the PICL plug-in module 206 provides PICL daemon 203 with a cleanup routine, and at step 503, it provides PICL daemon 203 with its name. At step 504, it is determined whether a PICL plug-in module 206 is invoked. If so, then at step 505 a .init section of the PICL plug-in module 206 is defined. Next, at step 506, the invoked PICL plug-in module 206 collects all relevant platform information. At step 507, the PICL plug-in module 206 creates nodes and/or properties to represent the configuration in the PICL tree. At step 508, it is determined if any changes have been made to the PICL tree. If so, then at step 509, the PICL plug-in module 206 creates additional threads to monitor the platform configuration. Finally, at step 510, the PICL tree is updated by the invoked PICL plug-in module 206.

Having described the preferred embodiments of the system and method for allowing user applications to access hardware platform specific configuration information in a generic manner, it should be apparent to those skilled in the art that certain advantages of the described system and method have been achieved. It should also be appreciated that various modifications, adaptations and alternative embodiments thereof may be made within the scope and spirit of the present invention. The invention is further defined by the following claims and their full scope of equivalents.

We claim:

1. A method for providing platform-specific configuration information associated with a hardware platform for a computer system to a user in a generic manner, comprising:
providing a platform independent configuration layer (PICL) associated with a PICL tree;
providing a plug-in module associated with the hardware platform, wherein the plug-in module is operable to contain platform configuration information associated with the hardware platform;
encapsulating platform-specific code associated with the hardware platform into the plug-in module;
collecting platform configuration information; and
creating structures in the PICL tree, wherein the structures are associated with the platform configuration information; and
providing access to the user to the PICL tree.

2. The method of claim 1, further comprises the step of providing a PICL daemon operable to maintain and control access to the PICL tree and instantiating the plug-in module.

3. The method of claim 2, wherein said step of collecting platform configuration information further comprises the step of instantiating the plug-in module with the platform configuration information.

4. The method of claim 3, wherein the step of providing a plug-in module associated with the hardware platform further comprises registering the plug-in module with the PICL daemon.

5. The method of claim 4, wherein the step of registering the plug-in module with the PICL daemon further comprises providing the PICL daemon with an entry point associated with a routine associated with the plug-in module.

6. The method of claim 4, wherein the step of registering the; plug-in module with the PICL daemon further comprises providing the PICL daemon with a name associated with the plug-in module.

7. The method of claim 4, wherein the step of, providing access to the user to the PICL tree further comprises providing a PICL interface operable to enable the user to query the PICL daemon.

8. The method of claim 7, wherein the step of providing access to the user to the PICL tree further comprises providing a plug-in publishing interface; and
a PICL tree interface in the plug-in publishing interface operable to allow the PICL daemon to retrieve data associated with the platform configuration information from the PICL tree.

9. The method of claim 8, wherein the step of registering the plug-in module with the PICL daemon further comprises:
providing a plug-in registration interface in the plug-in publishing interface; and accessing the plug-in registration interface.

10. The method of claim 1, wherein said step of creating structures in the PICL tree further comprises the step of creating a node in the PICL tree, wherein the node is associated with the platform configuration information.

11. The method of claim 1, wherein said step of creating structures in the PICL tree further comprises the step of creating a property in the PICL tree, wherein the property is associated with the platform configuration information.

12. The method of claim 1, wherein the step of creating structures in the PICL tree further comprises the step of creating a thread to monitor the platform configuration.

13. A computer system, wherein a user can access platform-specific configuration information associated with a hardware platform in a generic manner, comprising:
an operating system operable to interface with the hardware platform; and
a platform independent configuration layer (PICL) framework operable to interface with the user and the operating system, comprising:
a PICL tree operable to contain structures associated with platform configuration information; and
a plug-in module associated with the hardware platform, wherein the plug-in module is operable to be encapsulated with platform-specific code associated with the hardware platform, contain platform configuration information associated with the hardware platform and create structures in the PICL tree, wherein the structures are associated with the platform configuration information.

14. The system of claim 13, wherein the plug-in module is operable to create a node in the PICL tree, wherein the node is associated with platform configuration information.

15. The system of claim 13, wherein the plug-in module is operable to create a property in the PICL tree, wherein the property is associated with platform configuration information.

16. The system of claim 13, wherein the PICL framework further comprises a PICL daemon operable to instantiate the plug-in module with platform configuration information associated with-the hardware platform.

17. The system of claim 16, wherein the PICL daemon is operable to receive requests for platform configuration information from the user and access the PICL tree to retrieve, the platform configuration information.

18. The system of claim 17, wherein the PICL framework further comprises a PICL interface operable to allow a user to transmit a request to the PICL framework and receive platform configuration information associated with the request from the PICL framework.

19. The system of claim 18, wherein the PICL framework further comprises a PICL tree interface operable to allow the PICL daemon to access the PICL tree and retrieve platform configuration information associated with a request transmitted by the user.

20. The system of claim 19, wherein the PICL framework further comprises a plug-in registration interface operable to allow the plug-in module to register with the PICL daemon.

21. The system of claim 20, wherein the PICL framework further comprises a plug-in publishing interface operable to enable the plug-in module to interface with the PICL tree, wherein the plug-in publishing interface comprises the PICL tree interface and the plug-in registration interface.

22. The system of claim 21, wherein the plug-in module is operable to perform platform-specific functions.

23. The system of claim 22, wherein the plug-in module is operable to perform environmental monitoring.

* * * * *